United States Patent [19]

Debets et al.

[11] Patent Number: 5,482,997
[45] Date of Patent: Jan. 9, 1996

[54] POLYAMIDE COMPOSITIONS

[75] Inventors: Wilhelmus A. M. Debets, Sittard; Herman A. J. Schepers, Stein, both of Netherlands

[73] Assignee: Stamicarbon B.V., Geleen, Netherlands

[21] Appl. No.: 195,056

[22] Filed: Feb. 14, 1994

Related U.S. Application Data

[63] Continuation of Ser. No. 758,472, Sep. 6, 1991, abandoned, which is a continuation of Ser. No. 369,501, Jun. 22, 1989, abandoned.

[30] Foreign Application Priority Data

Jun. 23, 1988 [NL] Netherlands ............................ 8801593

[51] Int. Cl.⁶ .................................................. C08L 77/00
[52] U.S. Cl. .............................. 525/66; 524/504; 524/514; 525/179
[58] Field of Search ........................................ 525/66, 179

[56] References Cited

U.S. PATENT DOCUMENTS

| | | | |
|---|---|---|---|
| 4,528,326 | 7/1985 | Dean | 525/66 |
| 4,777,211 | 10/1988 | Lavengood et al. | 525/66 |
| 4,981,906 | 1/1991 | Tomono et al. | 525/66 |
| 5,049,613 | 9/1991 | Shimizu et al. | 525/66 |
| 5,122,570 | 6/1992 | Subramanian | 525/66 |
| 5,237,003 | 8/1993 | Otawa et al. | 525/66 |

FOREIGN PATENT DOCUMENTS 62-22844  1/1987  Japan ........................................ 525/66

*Primary Examiner*—Ana L. Carrillo
*Attorney, Agent, or Firm*—Cushman Darby & Cushman

[57] ABSTRACT

Impact resistant polyamide composition containing more than 45 wt. % polyamide and relatively minor amounts of an impact modifier. The impact modifier is an elastomer with groups that are reactive with respect to the polyamide. The impact modifier has an adverse effect on the high-temperature properties, which were already poor. According to the invention, compositions of polyamide, impact modifier and a copolymer of a vinylaromatic compound, in particular styrene, and maleic anhydride have improved high-temperature properties while maintaining good impact resistance.

20 Claims, No Drawings

POLYAMIDE COMPOSITIONS

This is a continuation of application Ser. No. 07/758,472 filed Sep. 6, 1991 (now abandoned) which was a continuation of application Ser. No. 07/369,501 filed on Jun. 22, 1989 (now abandoned).

The invention relates to polyamide compositions based on polyamide and minor amounts of an elastomer with groups that are reactive with respect to the polyamide.

U.S. Pat. No. 4,174,358 describes polyamide compositions with improved impact resistances, which contain a component that may be an elastomer and that must be bound to the polyamide. According to that patent publication, the mechanism of the bond is not entirely clear and the bond may be realized by links varying from hydrogen bonds to covalent bonds. Apparently such a component must contain groups that are reactive with respect to the polyamide.

For a long time there has been a need for polyamides with improved impact resistance and many and various suggestions have therefore been made to improve the impact resistance of polyamides. Polyamide compositions containing an elastomer with reactive groups as impact modifier are also described in EP-A-194.705.

Although the polyamide compositions described in the aforementioned patents present more than sufficient impact resistance, their properties at increased temperatures leave something to be desired.

Besides on the material itself, the so-called high-temperature properties of plastics and, more in particular, of polyamides and polyamide mixtures depend on the nature of the temperature load and on the conditions under which the temperature loading takes place. Of importance is the degree to which the mechanical and physical properties are maintained or change at elevated temperatures and at what temperatures these properties deteriorate significantly.

The heat distortion temperature according to ASTM standard D-648 is, for example, sometimes determined as a measure of the temperature sensitivity of the stiffness of the material. In this determination the temperature is measured at which a plastic test bar with a rectangular cross section deflects 0.25 mm under a stated load. This distortion temperature is often referred to as HDT (Heat Distortion Temperature).

The modulus in torsion at different temperatures is also a measure of the changes in the properties at increased temperatures. The modulus in torsion is measured with a torsional tester at a frequency of 0.2153 Hz and at a heating rate of 1° C./min. The values of the modulus in torsion at 80° C. and 100° C. are recorded.

Modifying polyamides with an impact modifier, as is known from, for example, the aforementioned patents, has an adverse effect on the heat distortion temperature (HDT) and the modulus in torsion. This is a serious disadvantage, because of increased temperatures the properties of polyamides as such already leave something to be desired. The usually substantial improvement of the impact resistance of polyamides is accompanied by an undesired deterioration of the already unsatisfactory properties at increased temperatures of the polyamides themselves.

Therefore there is a great need for polyamide compositions with good impact resistance as well as good high-temperature properties.

The aim of the invention is therefore to provide impact-resistance polyamide compositions with improved properties at elevated temperatures.

It has been found that polyamide compositions consisting of:

a) more than 45 wt. % polyamide,
b) 3–35 wt. % of an elastomer with groups that are reactive with respect to the polyamide,
c) 3–30 wt. % of a copolymer of a vinylaromatic compound and maleic anhydride with a molecular weight of at least 50,000 and a maleic anhydride content of 8–30 wt. % have good impact resistance and, moreover, good, or at least improved, high-temperature properties.

The polyamides contained in the compositions according to the invention are commonly known. They have a molecular weight of at least 5000 and are condensation products of dicarboxylic acids with 4–12 carbon atoms and diamines with 4–14 carbon atoms or of lactams. Polyamides that are often used are, for example: polyhexamethyleneadipamide (nylon 6,6), polyhexamethylene azelamide (nylon 6,9), polyhexamethylene sebacamide (nylon 6,10), polyhexamethylene lauramide (nylon 6,12), polytetramethylene adipamide (nylon 4,6), polycaprolactam (nylon 6), polylaurinolactam (nylon 12), etc. Polycondensates of two or more dicarboxylic acids and/or two or more diamines, and mixtures of two or more polyamides may also constitute the polyamide component of the compositions discussed here. Preferably, the polyamide component consists entirely or largely of nylon 4,6; nylon 6,6 or nylon 6. Copolymer amides, such as polyamide imides of polyester amides may also be used in compositions according to the invention.

The impact modifiers published in U.S. Pat. No. 4,174,358 comprise elastomers with reactive groups and such impact modifiers may be component b) of the compositions discussed here.

The criterion to be met by component b) is that it has elastomeric properties. With the exception of the requirement that component b) must contain reactive groups, its molecular structure is of no importance otherwise. Any compound consisting of large molecules with elastomeric properties may be used. The elastomer may be chosen from, for example, the group comprising the commonly known ethylene-propylene-copolymers, ethylene-propylene-diene-terpolymers, polyisobutene rubbers, polyisoprenes and polybutadienes, but other elastomers may equally be used. The elastomer must be modified with reactive groups, for example by the grafting of a compound with reactive groups. Reactive groups are, for example, the carboxyl, anhydride, sulphonic acid or acid chloride groups. Preferably, the reactive groups are carboxyl or acid anhydride groups.

The aforementioned elastomers are commonly known, and therefore further description may be omitted. The compound that is to be grafted on them preferably contains at least two carboxylic groups or groups that can be converted thereto, such as maleic acid, fumaric acid, itaconic acid, citraconic acid, mesaconic acid, the anhydrides of maleic acid, itaconic acid and citraconic acid, monoalkyl esters of the aforementioned acids, the alkyl group preferably containing 1 or 2 carbon atoms, bicyclo-(2,2,1)-hept-5-ene-2,3-dicarboxylic anhydride. In general, it is desirable that 0.1–10 wt. % and preferably 0.5–5 wt. % of one or more of the aforementioned compounds is grafted. Elastomers containing such reactive groups are known per se, and therefore further discussion may be omitted here. Embodiments of such a modification are described in EP-A-125.739.

The impact modifying component b) may also be a product that is obtained by grafting one or more reactive groups onto a mixture of 5–95 wt. % rubbery ethylene polymer and 95–5 wt. % propylene polymer, as described in greater detail in the applicant's previous patent application EP-A-194.705. The reactive groups may be obtained by, for example, grafting a polybasic carboxylic acid or a derivative thereof onto such a mixture. Preferably, it is grafted with maleic anhydride, so that the product contains 0.1–3 wt. % grafted maleic anhydride.

Component c), that is, the copolymer of a vinylaromatic compound and maleic anhydride, is preferably a copolymer of styrene, although copolymers of other vinylaromatic compounds, such as alphamethylstyrene, may also be used. The molecular weight of the preferably used styrene-maleic anhydride copolymers is between 50,000 and 500,000. Copolymers with molecular weights of 100,000–300,000 are preferred. The maleic anhydride content, which must be between 8 and 35 wt. %, is preferably 10–30 wt. %. Such copolymers are known in the art and can be prepared in a manner known for the preparation of statistical copolymers of styrene and maleic anhydride, for example as described by Hanson and Zimmerman in 'Ind. Chem. Eng.' 49, 1803 (1957). It is in any case important that the polymerization is carried out with thorough mixing, because otherwise a block copolymer, whether or not together with styrene homopolymer, is also obtained. The styrene-maleic anhydride copolymer must be entirely or largely a statistical copolymer.

The copolymer of styrene and maleic anhydride may contain minor amounts, up to about 30 wt. %, of other monomers, such as acrylonitrile, methyl acrylate and the like or imides. Preferably, it contains an imide and more preferably it can be regarded as being derived from styrene-maleic anhydride copolymers by replacement of part of the maleic anhydride by maleimide. This improves the heat resistance of the copolymer without adversely affecting other properties. Such terpolymers can be prepared in various manners that are known per se.

The aforementioned amounts of the components of the composition discussed are relative to the total amount of components a) plus b) plus c) which is equated with 100 wt. %. In addition, the compositions may contain the usual additives, such as stabilizers, lubricants, mould release agents, fillers which may or may not have a reinforcing effect, softeners, colourants, pigments, etc.

Preferably, the polyamide compositions discussed here contain:
a) more than 45 wt. % polyamide
b) 10–30 wt. % elastomer with reactive groups, which is more preferably a product that is obtained by grafting maleic anhydride onto a mixture of 5–95 wt. % ethylene-propylene copolymer or ethylene-propylene-diene-terpolymer and 95–5 wt. % propylene polymer and
c) 5–20 wt. % styrene-maleic anhydride copolymer or styrene-maleic anhydride-maleimide terpolymer.

Components a), b) and c) of the compositions discussed here may be mixed according to any known method. They are preferably mixed in an extrusion device. One or more additives may be incorporated into the composition according to the invention at any suitable moment or may be mixed with one or more of the components beforehand.

In addition to the aforementioned usual additives, the compositions according to the invention may contain up to 50 wt. % fillers, such as fibrous or powdered fillers, which may or may not have a reinforcing effect.

Suitable fillers are carbon powder or carbon fibres, glass fibres, silica, asbestos, calcium silicate, aluminium silicate, magnesium carbonate, kaolin, chalk, quartz, mica, feldspar, etc.

The invention is further elucidated and illustrated with the following examples without being limited thereby in any way.

EXAMPLES 1 THROUGH 10 AND COMPARATIVE EXAMPLES A–F

A number of compositions were prepared by each time filling a kneader (Brabender PLE 330) with a volume of 50 ml with polyamide, elastomer grafted with maleic anhydride, styrene-maleic anhydride copolymer and stabilizer.

The polyamide was Ultramid B3, a nylon-6 marketed by BASF with a number-average molecular weight of about 20,000. The Ultramid B3 used in the examples was taken from two different batches and is therefore referred to as nylon-1 and nylon-2, respectively.

The impact modifier was a Keltan 778 grafted with 1 wt. % maleic anhydride, a ethylene-propylene-ethylidenenorbornene-terpolymer marketed by DSM containing 65 wt. % ethylene and having an $M_n$ of 60,000 (referred to as IM-1) or a Keltaflex N35, a thermoplastic polymer based on 50 wt. % polypropylene and 50 wt. % EPDM rubber, grafted with 1.5 wt. % maleic acid anhydride (referred to as IM-2), which is marketed by DSM.

For the purpose of comparison, Styron 686E, a polystyrene marketed by Dow Chemical Comp. (referred to as PS), which is a styrene polymer without maleic anhydride, was used as component c). In the examples according to the invention use was made of four styrene-maleic anhydride copolymers, referred to as SMA-1 through SMA-4:

SMA-1 contains 14 wt. % maleic anhydride and has a molar mass of 200,000.
SMA-2 contains 22 wt. % maleic anhydride and has a molar mass of 200,000.
SMA-3 contains 28 wt. % maleic anhydride and has a molar mass of 100,000.
SMA-4 contains 28 wt. % maleic anhydride and has a molar mass of 160,000.

0.5 wt. % Irganox 1076 (octadecyl-3-(3,5-di-tert.-butyl-4-hydroxyphenyl)propionate) and 0.2 wt. % boric acid were added to all of the compositions.

The compositions were mixed in the kneader under nitrogen for 10 minutes at 230° C. and 30 RPM. The mixtures thus kneaded were compression moulded into 3 mm thick plates for 12 minutes at 240° C. Test bars were milled from the plates thus moulded to measure the notched impact resistance, the HDT and the modulus in torsion.

The notched impact resistance (Izod) was determined according to ISO-180 at 23° C. in $kJ/m^2$. The test bars were dried in vacuo for 24 hours at 60° C. before the determination.

The heat distortion temperature (HDT) was measured according to ASTM D 648 at a load of 1.8 MPA in °C. The test bars were dried in vacuo at 50° C. for 40 hours before the determination.

The modulus in torsion was determined with a torsional tester at a frequency of 0.2153 Hz at 80° C. and 100° C. The heating rate was 1° C./min. The test bars were dried in vacuo at 80° C. for 24 hours before the determination.

The compositions and the notched impact resistance (Izod), HDT and modulus in torsion are given in the following tables I through III.

TABLE I

| Example | Nylon-1 wt. % | IM-1 wt. % | SMA-1 wt. % | Izod KJ/m² | HDT °C. | Modulus in torsion G' (Pa) 80° | 100° C. |
|---|---|---|---|---|---|---|---|
| A | 100 | — | — | 5 | 71 | 3.6 | 2.5 |
| B | 78 | 22 | — | 90 | 59 | 2.2 | 1.6 |
| 1 | 68 | 22 | 10 | 72 | 65 | 2.6 | 1.8 |

TABLE II

| Example | Nylon-2 wt. % | IM-2 wt. % | PS wt. % | SMA-1 wt. % | SMA-2 wt. % | SMA-3 wt. % | SMA-4 wt. % | Izod KJ/m² | HDT °C. | Modulus in torsion G' (Pa) 80° C. | 100° C. |
|---|---|---|---|---|---|---|---|---|---|---|---|
| C | 78 | 22 | — | — | — | — | — | 87 | 55 | 1.9 | 1.3 |
| D | 68 | 22 | 10 | — | — | — | — | 20 | 58 | 2.1 | 1.3 |
| 2 | 68 | 22 | — | 10 | — | — | — | 82 | 61 | 2.3 | 1.5 |
| 3 | 68 | 22 | — | — | 10 | — | — | 68 | — | 2.4 | 1.8 |
| 4 | 68 | 22 | — | — | — | 10 | — | 58 | — | 2.8 | 2.1 |
| 5 | 68 | 22 | — | — | — | — | 10 | 67 | 66 | 2.7 | 2.0 |

TABLE III

| Example | Nylon-2 gew. % | IM-2 gew. % | SMA-1 gew. % | SMA-4 gew. % | Izod KJ/m² | HDT °C. | Modulus in torsion G' (Pa) 80° C. | 100° C. |
|---|---|---|---|---|---|---|---|---|
| 6 | 73 | 22 | 5 | — | 80 | 59 | 2.0 | 1.3 |
| 2 | 68 | 22 | 10 | — | 82 | 61 | 2.3 | 1.5 |
| 7 | 63 | 22 | 15 | — | 49 | 62 | 2.3 | 1.5 |
| 8 | 58 | 22 | 20 | — | 31 | 69 | 2.7 | 1.8 |
| 9 | 50 | 25 | 25 | — | 40 | 66 | 2.5 | 1.7 |
| 10 | 73 | 22 | — | 5 | 79 | 58 | 2.3 | 1.3 |
| 5 | 68 | 22 | — | 10 | 67 | 66 | 2.7 | 2.0 |
| E | 40 | 25 | 35 | — | 5 | 63 | 2.3 | 1.3 |
| F | 43 | 22 | — | 35 | 5 | 71 | 3.3 | 2.2 |

The examples referred to with capitals A through F are comparative examples that are not in accordance with the invention. Examples 1 through 10 are according to the invention.

The examples and comparative examples show that the addition of an impact modifier can result in an increase in the notched impact resistance of polyamide from 5 KJ/m² to about 90 KJ/m², but that the HDT then drops to below 60° C. The modulus in torsion also decreases. For many applications notched impact resistances of much less than about 90 KJ/m² are still very satisfactory. Addition of component c) referred to as SMA-1 through SMA-4 results in a decrease in the notched impact resistance, but significantly improves the HDT and the modulus in torsion.

Comparative example D shows that with a styrene polymer without maleic anhydride the HDT and the modulus in torsion improve, but the notched impact resistance decreases dramatically. This decrease bears no relation to that with results from the addition of a component c according to the invention. Increasing amounts of SMA result in further reductions in the notched impact resistance. For a person skilled in the art it will be easy to determine the notched impact resistance that is still sufficient for a certain application in combination with the properties of HDT and modulus in torsion aimed at and, on the basis of this, to determine the composition that is the most suitable for that application.

The examples also show that a component c) with a high maleic anhydride content (28 wt. %; SMA-4) results in a somewhat lower notched impact resistance compared with an equal amount of component c) with a lower maleic anhydride content (14 wt. %; SMA-1), but that the high-temperature properties are better. With more than 30 wt. % of component c) good values are obtained for the HDT and modulus in torsion but the notched impact resistance becomes unacceptably low.

We claim:

1. A polyamide composition which consists of (a) more than 45 wt. % polyamide, (b) 10–30 wt. % of an elastomer containing functional groups reactive with said polyamide, wherein the elastomer containing reactive groups is obtained by grafting a monomer onto at least one rubbery ethylene polymer, wherein said monomer is a compound selected from the class consisting of compounds having at least one functional group selected from the group consisting of a carboxyl group, an anhydride group, a sulphonic acid group and an acid chloride group, (c) 5–20 wt. % of a statistical styrene-maleic anhydride copolymer or a styrene-maleic anhydride-maleimide terpolymer obtained by replacing a portion of the maleic anhydride groups in a statistical styrene-maleic anhydride copolymer with maleimide groups, wherein maleic anhydride is present in an amount of 8–35 wt. % and (c) has a molecular weight of 50,000 to 500,000, wherein the amounts of components (a), (b), and (c) are based on the total of (a), (b), and (c); and, optionally (d), at least one additive selected from the group consisting of stabilizers, fillers, lubricants, mold release agents, colorants, softeners, and pigments.

2. A polyamide composition consisting of (a) more than 45 wt. % of polyamide; (b) 3–35 wt. % of an elastomer containing functional groups reactive with said polyamide, wherein the elastomer containing reactive groups is obtained by grafting maleic anhydride onto a compound selected from the group consisting of the class of compounds resulting from mixing 5–95 wt. % rubbery ethylene polymer and 95–5 wt. % propylene polymer; (c) 3–30 wt. % of a statistical copolymer of a vinylaromatic compound and maleic anhydride which has a molecular weight of at least 50,000 and a maleic anhydride content of 8–35 wt. %, wherein the amounts of components (a), (b), and (c) are based on the total of (a), (b), and (c); and, optionally, (d) at least one additive selected from the group consisting of stabilizers, fillers, lubricants, mold release agents, colorants, softeners, and pigments.

3. A polyamide composition according to claim 2, wherein (c) is a styrene-maleic anhydride copolymer or a styrene-maleic anhydride-maleimide terpolymer obtained by replacing a portion of the maleic anhydride groups in a styrene-maleic anhydride copolymer with maleimide groups.

4. A polyamide composition according to claim 2, wherein (c) has a molecular weight of up to 500,000.

5. A polyamide composition according to claim 2, wherein (c) has a molecular weight of 100,000 to 300,000.

6. A polyamide composition according to claim 2, wherein (c) is present in an amount of 5 to 20 wt. %.

7. A polyamide composition according to claim 2, wherein said polyamide is at least one selected from the group consisting of nylon 6, nylon 6,6, and nylon 4,6; and (c) is a styrene-maleic anhydride copolymer or a styrene-maleic anhydride-maleimide terpolymer obtained by replacing a portion of the maleic anhydride groups in a styrene-maleic anhydride copolymer with maleimide groups.

8. A polyamide composition according to claim 2, wherein (d) is at least one additive selected from the group consisting of stabilizers, fillers, mold release agents, colorants, and pigments.

9. A polyamide composition according to claim 2, wherein said composition consists of (a), (b) and (c).

10. A polyamide composition based on polyamide and an elastomer containing groups which are reactive with respect to the polyamide, wherein said polyamide composition consists of:

(a) more than 45 wt. % polyamide, (b)(1) 3–35 wt. % of a rubbery polymer selected from the group consisting of an ethylene-propylene copolymer, an ethylene-propylene-diene terpolymer, polyisobutene rubber, polyisoprene rubber, and polybutadiene rubber, grafted with (b)(2) 0.1–10 wt. % of a compound selected from the class consisting of compounds having at least one functional group selected from the group consisting of a carboxyl group, an anhydride group, a sulphonic acid group and an acid chloride group, (c) 3–30 wt. % of a statistical copolymer of a vinylaromatic compound and maleic anhydride which has a molecular weight of at least 50,000 and a maleic anhydride content of 8–35 wt. %, wherein the amounts of components (a), (b)(1), (b)(2) and (c) are based on the total of (a), (b)(1), (b)(2) and (c), and optionally, (d) at least one additive selected from the group consisting of stabilizers, fillers, lubricants, mold release agents, colorants, softeners, and pigments.

11. A composition according to claim 10, wherein said composition consists of (a), (b) and (c).

12. A polyamide composition according to claim 10 or 11, wherein (c) is a styrene-maleic anhydride copolymer.

13. A polyamide composition according to claim 10 or 11, wherein (c) is a styrene-maleic anhydride copolymer having a molecular weight between 100,000 and 300,000.

14. A polyamide composition according to claim 10 or 11, wherein the maleic anhydride content of component (c) is 10–30 wt. %.

15. A polyamide composition according to claim 10, wherein component (c) is a styrene-maleic anhydride copolymer having an maleic anhydride content of 10–30 wt. %.

16. A polyamide composition according to claim 10 or 11 wherein (c) is a styrene-maleic anhydride-maleimide terpolymer obtained by replacing a portion of the maleic anhydride groups in a styrene-maleic anhydride copolymer with maleimide groups.

17. A polymer composition according to claim 10, wherein said rubbery polymer is an ethylene-propylene-diene terpolymer.

18. A polyamide composition according to claim 10 or 17, wherein the polyamide is at least one selected from the group consisting of nylon 6, nylon 6,6, and nylon 4,6.

19. A polymer composition according to claim 10 or 17, wherein (c) is a styrene-maleic anhydride copolymer or a styrene-maleic anhydride-maleimide terpolymer obtained by replacing a portion of the maleic anhydride groups in a styrene-maleic anhydride copolymer with maleimide groups having a molecular weight of up to 500,000.

20. A polymer composition according to claim 18, wherein (c) is a styrene-maleic anhydride copolymer or a styrene-maleic anhydride-maleimide terpolymer obtained by replacing a portion of the maleic anhydride groups in a styrene-maleic anhydride copolymer with maleimide groups having a molecular weight of up to 500,000.

* * * * *